(12) United States Patent
Bigioi et al.

(10) Patent No.: US 10,587,812 B2
(45) Date of Patent: *Mar. 10, 2020

(54) METHOD OF GENERATING A DIGITAL VIDEO IMAGE USING A WIDE-ANGLE FIELD OF VIEW LENS

(71) Applicant: FotoNation Limited, Galway (IE)

(72) Inventors: Petronel Bigioi, Galway (IE); Christopher Dainty, Barna (IE); Peter Corcoran, Claregalway (IE)

(73) Assignee: FotoNation Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,026

(22) Filed: Nov. 6, 2017

(65) Prior Publication Data
US 2018/0124325 A1    May 3, 2018

Related U.S. Application Data

(63) Continuation of application No. 13/862,372, filed on Apr. 12, 2013, now abandoned.

(51) Int. Cl.
*H04N 5/232* (2006.01)
*H04N 5/357* (2011.01)

(52) U.S. Cl.
CPC ....... *H04N 5/23296* (2013.01); *H04N 5/3572* (2013.01)

(58) Field of Classification Search
CPC ........................................................ H04N 5/33
USPC ........................................................ 348/144
See application file for complete search history.

(56) References Cited

U.S. PATENT DOCUMENTS

| 2008/0024594 A1* | 1/2008 | Ritchey | H04N 5/2254 348/36 |
| 2008/0029714 A1* | 2/2008 | Olsen | G02B 7/04 250/475.2 |
| 2012/0120277 A1* | 5/2012 | Tsai | H04N 5/23212 348/223.1 |

* cited by examiner

*Primary Examiner* — Jefferey F Harold
*Assistant Examiner* — Sihar A Karwan

(57) ABSTRACT

A method of generating a digital video image uses a wide-angle field of view (WFOV) lens positioned closely in front of an image sensor array so that the image field of the lens is so curved at the sensor array that different regions of the image field are substantially in focus on the sensor array for different positions of the lens. The method comprises selecting a desired region of interest in the image field of the lens, and adjusting the lens/array distance to bring the region of interest into focus on the sensor array. The in-focus region of interest is stored and at least partially corrected for field-of-view distortion due to the WFOV lens. The corrected image is displayed, locally and/or remotely. These steps are cyclically repeated to provide the video image.

20 Claims, 5 Drawing Sheets

METHOD OF GENERATING A DIGITAL VIDEO IMAGE USING A WIDE-ANGLE FIELD OF VIEW LENS

This invention relates to a method of generating a digital video image using a wide-angle field of view (WFOV) lens. The invention is especially applicable to, but not limited to, the use of a mobile phone (cell phone) or other embedded device or digital image acquisition device, e.g., for video conferencing.

A typical mobile phone has a built-in camera with front and/or rear facing lenses. The front lens is used when the phone is used as a traditional camera, while the rear facing lens, which is on the same side of the camera as the viewing screen, is used when the user wishes to make a video call to another user. The typical field of view (FOV) of the rear facing lens is a 55 to 60 degree cone centred symmetrically about optical axis of the lens. When used for video calling, as illustrated in the example of FIG. 1, the camera 10 is held usually at arm's length in front of the user 12 with its rear lens facing the user (the lenses are not shown since they are usually recessed below the surface of the phone). As stated, the rear lens has a 55-60 degree FOV 14 centred on its optical axis 16.

Such a phone could be conventionally used as a video conferencing device by passing the phone from one person to another as the need arises. This is unsatisfactory and does not promote a natural interactive conference.

It would be desirable to adapt a mobile phone or indeed any digital image acquisition device for video conferencing so that the phone can be laid flat on a table with its rear lens facing upwards. The desired lens would also have a sufficiently wide-angle field of view (WFOV) that all participants sitting round the table are included in the single field of view, as illustrated in the example of FIG. 2. The distance of the user 12 from the phone will depend on the angle of the FOV 14, but typically the sitting distance will be about 40 cm for a FOV of 140 degrees, the cut-off point being about 15 cm below the shoulder. However, the use of a WFOV lens in such an application conventionally would give rise to problems of focus and distortion in the image captured by the phone.

As to distortion, WFOV lenses typically produce an image which is heavily distorted, especially at its edges where the conference participants would normally be seated. It would be desirable to have a system wherein this distortion is at least partially corrected.

The problem of focus is illustrated in FIGS. 3A-3B. FIG. 3A schematically shows an example of a conventional optical system, where a composite lens 20 has a normal field of view 14 (typically, e.g., 55 degrees) and is relatively distant from the image sensor 22. Although the image field 24 (known as the Petzval surface) is typically curved at the image sensor 22, the curve is very shallow compared to the plane of the sensor, so that the portion of the image field 24 falling on the sensor 22 can be brought substantially into focus over the entire area of the sensor.

However, in the case of a WFOV lens 20' positioned close to the sensor 22, as in the example illustration of FIG. 3B, as would be the case in a mobile phone or similar compact format devices, the image field 24 is significantly curved relative to the plane of the sensor 22 so that for any given distance between the lens 20 and the sensor 22, a part of the image field, less than the entire image field, is substantially in focus on the sensor. By moving the lens 20' towards or away from the image sensor 22, as indicated by the double-headed arrow in FIG. 3B, different regions of the image field can be brought substantially into focus on the sensor. This is shown schematically in the example of FIGS. 4A-4F.

In FIGS. 4A-4F the lens 20' (not shown) has moved progressively nearer to the image sensor 22. The parallel lines 26 which intersect the image field 24 indicate which region of the image field is in focus for that setting on the lens. The in-focus region 28 is shown hatched in FIGS. 4A-4C. FIGS. 4D-4F illustrate the corresponding positions of the image fields from FIGS. 4A-4C, respectively, relative to the image sensor in each case. Thus, in FIG. 4A just the central region of the image field having radius r is shown to be in focus. In FIG. 4B an annular region between $r_0$ and $r_1$ surrounding the central region is in focus. In FIG. 4C an outer annular region is in focus. The lens 20' is not confined just to move stepwise between the three positions shown. The lens may be configured to move progressively and smoothly towards or away from the image sensor 22. The in-focus region will generally expand or contract more or less equally smoothly.

It is desired to mitigate these problems both in mobile phones used in video conferencing and also in other devices where a WFOV lens is placed closely in front of an image sensor.

DETAILED DESCRIPTION OF THE EMBODIMENTS

A method is provided for generating a digital video image using a lens positioned in front of an image sensor array. The lens has a sufficiently wide field of view (WFOV), and is positioned sufficiently near to the sensor array, that the image field of the lens is so curved at the sensor array that different regions of the image field are substantially in focus on the sensor array for different positions of the lens relative to the sensor array.

The method in accordance with certain embodiments includes:
  (a) selecting a desired region of interest in the image field of the lens,
  (b) adjusting the position of the lens relative to the sensor array so that the selected region of interest is brought substantially into focus on the sensor array,
  (c) capturing and storing the image on the sensor array of the substantially in-focus selected region of interest,
  (d) at least partially correcting the stored substantially in-focus image for field-of-view distortion due to said WFOV lens,
  (e) displaying the corrected image, and
  (f) cyclically repeating steps (a) to (e).

Further embodiments will next be described, by way of example, with reference to the accompanying drawings FIGS. 5-6.

Figure 1:
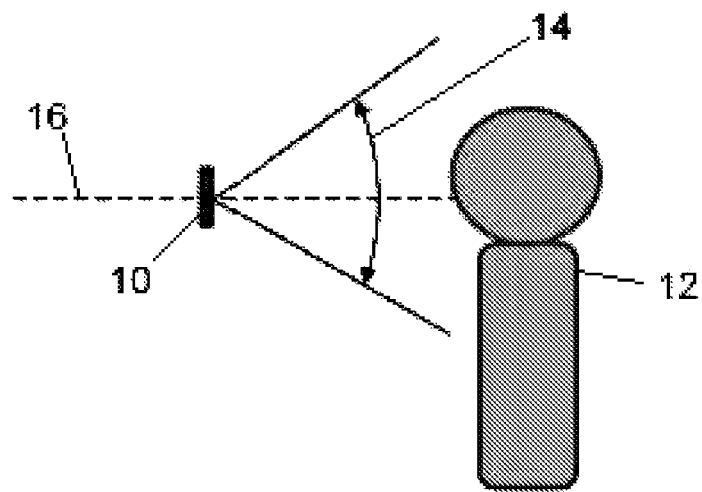
FIG. 1 illustrates the conventional use of a mobile phone for video calling.
Figure 2:
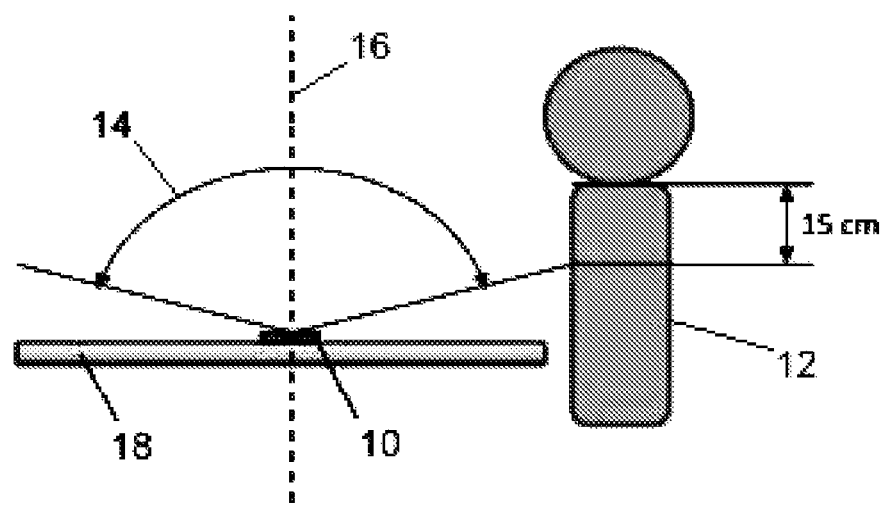
FIG. 2 illustrates the desired use of a mobile phone for video conferencing.
Figure 5:
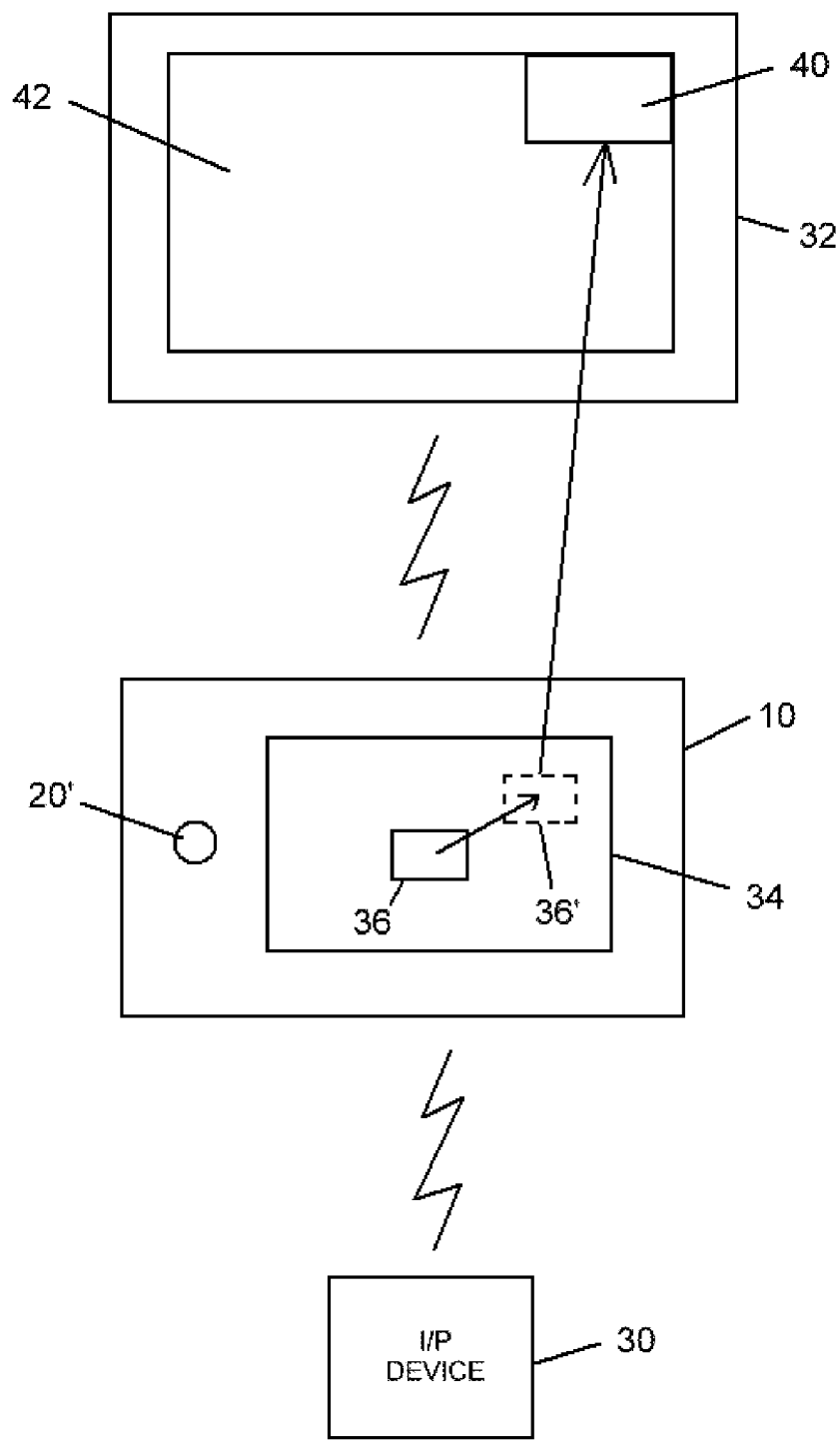
FIG. 5 is a schematic diagram of a video conferencing system in accordance with certain embodiments.

In FIG. 5, a digital image acquisition device, for example, a mobile phone 10 is laid rear-side up flat on a table such as the table illustrated in side view in FIG. 2. The mobile phone 10 includes a digital image acquisition component including a WFOV lens 20'. The lens 20' may be configured as shown in FIGS. 4A-4F. The lens 20' has a sufficiently wide field of view (FOV), and is positioned sufficiently near to the sensor array 22, that the image field of the lens is so curved at the sensor array that different regions of the field of view of the lens image field are substantially in focus on the sensor array for different positions of the lens relative to the sensor array. The lens 20' may be an autofocus MEMS lens. These provide for very rapid lens movement for focussing. Examples of such lenses and lens modules are disclosed in U.S. Pat. No. 8,358,925, US 2012/0119425, and US 2012/0119612, which are incorporated by reference. Examples of such lenses are commercially available from DigitalOptics Corporation under, for example, the model nos. DOC2054AFS, DOC2054AF, DOC3075AF. These lenses and lens modules incorporating these lenses can in turn be incorporated into image acquisition devices. Examples of devices which currently incorporate sensor arrays of size in accordance with certain embodiments and which could be adapted to include WFOV lenses of the above type include the Nokia 808 PureView which has a 41 Mpx 1/1.2" sensor.

The video conferencing system further includes an input device 30 such as a joystick or mouse, and a display monitor 32, both in communication with the phone 10, for example by Wi-Fi, Infra-Red, Bluetooth or any other suitable wired or wireless link. The rectangle 34 within the outline of the phone 10 represents, not to scale, the image field of the lens 20' falling on the sensor 22 positioned within the phone body immediately behind the lens. Actually the entire image field of the lens extends beyond the edges of the sensor, but in this discussion we will focus on the part falling on the sensor. This image field 34 will not be visible to the participants of the video-conference even if, as might be the case, it is displayed on the phone's display screen, because this will typically be facing down.

When video conferencing mode is selected, the camera software defines a default region of interest (ROI) 36. In certain embodiments, the default ROI is positioned centrally in the image field 34, although several alternative schemes are employed in further embodiments including: picking a ROI surrounding a largest face detected within the imaged FOV; or possibly directing the ROI towards a face which is determined to be speaking based on either video or audio analysis of the imaged FOV. If a central ROI is chosen, this may be pointing up at the ceiling in certain embodiments. Using the input device 30, the ROI 36 can be panned across the image field 34, for example to the position 36'.

The input device 30 local to one end of the conference could be used to interact with the display provided from a remote location to allow users at one end to manually select a ROI at the remote end. As such, in this case, movement of the local remote device 30 is in certain embodiments therefore relayed to the remote location and/or vice versa. If however control of the ROI to be displayed is local as in other embodiments, the commands may be received from a local input device 30.

As the ROI 36 moves across the image field the phone software continually adjusts the distance of the lens 20' from the sensor 22 to maintain the current ROI in focus. Due to the speed with which the position of the MEMS lens can be adjusted towards and away from the sensor, this is advantageously done substantially in real time. Alternatively, movement of the ROI to a particular location on the image field could be governed by: gesture recognition; for example, by recognising that a person within the field of view has raised his arm; or by face detection, wherein one or more persons within the field of view is/are detected as candidate regions of interest. In any case, the ROI 36 would move to cover such a detected person's head and shoulders.

The part of the image field on the sensor 22 corresponding to the instantaneous in-focus ROI 36 is successively captured at the video frame rate and stored for further processing. Such processing includes correcting each stored in-focus ROI 36 for field-of-view distortion introduced by the WFOV lens 20'. While such correction may not be perfect, especially as it has to be done once per video frame, it nevertheless tends to render the image advantageously much more true to life than the heavily distorted image produced by the lens 20'.

Figure 6:
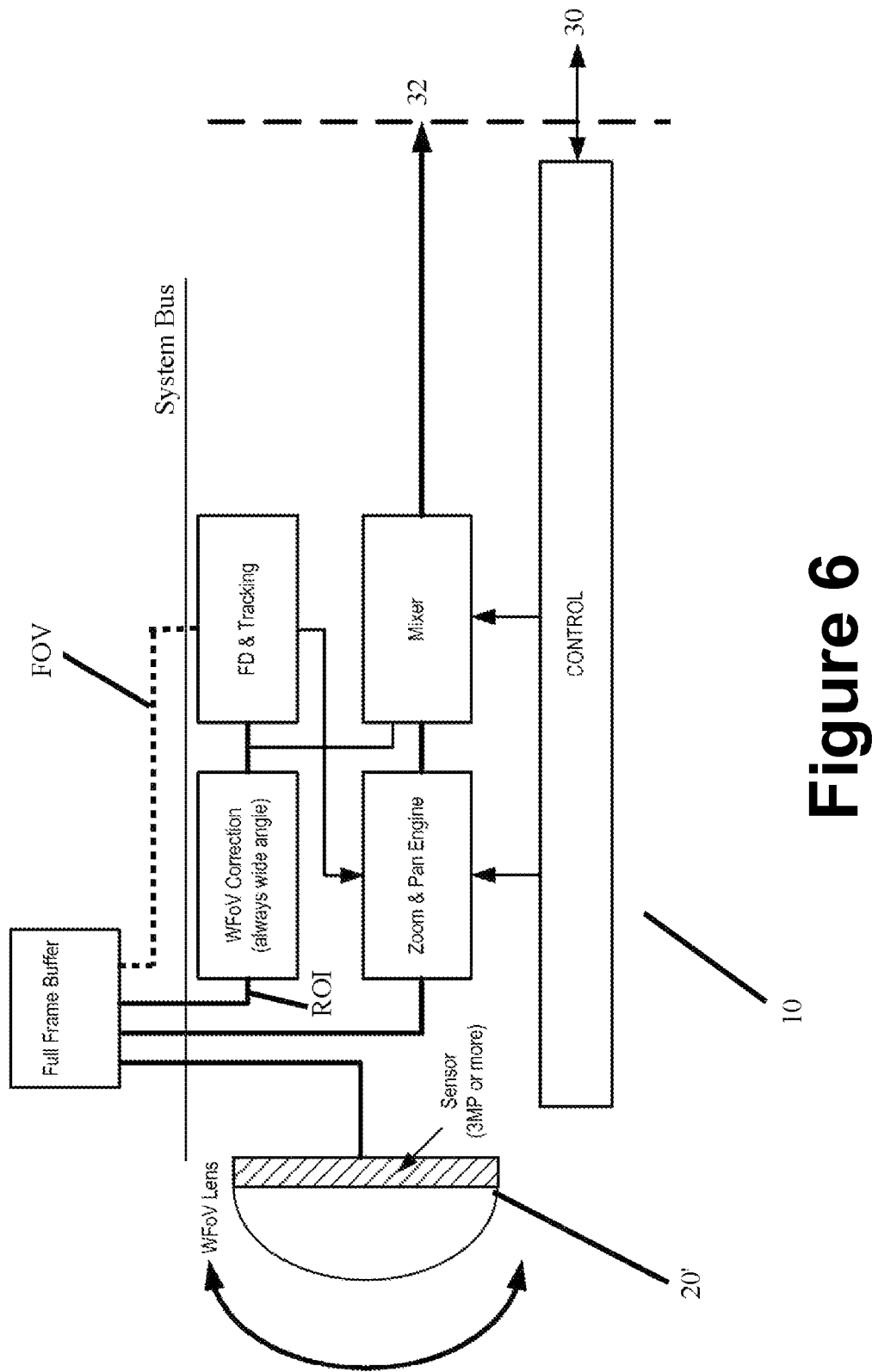
FIG. 6 shows schematically an exemplary digital image acquisition device for acquiring and processing a succession of images according to certain embodiments.

Referring to FIG. 6, patent applications such as PCT/EP2011/052970, U.S. application Ser. Nos. 13/077,891 and 13/541,650, which are incorporated by reference, disclose digital image acquisition devices including WFOV lens systems. Here, distorted WFOV images are read from a sensor via an imaging pipeline which can carry out simple pre-processing of an image, before being read across a system bus into a frame buffer in system memory for further processing.

Such systems can employ hardware modules or sub-modules also connected directly or indirectly to the system bus for reading successive images stored in system memory from the bus and for processing the image before either returning the processed image to system memory or forwarding the processed image for further processing by other modules.

In FIG. 6, for example, a WFOV correction module successively reads image portion(s) bounding areas of the frame buffer corresponding to selected ROIs within the image field and can provide corrected image portions to one or both of a mixer module and a face detection (FD) and tracking module. In certain embodiments, more than one region of interest may be tracked, corrected and/or displayed at any given time.

As explained below, the face detection and tracking module might alternatively obtain images directly from system memory independently of the correction module (as indicated by the dashed line).

A system controller controls the various hardware modules. The system controller is in certain embodiments responsive to, for example, commands received through a control interface from, for example, software applications running on the device with which a user interacts. In this case, the input device 30 (local or remote) may be used.

In FIG. 6, a zoom and pan module is connected to the controller and this in turn communicates with the WFOV correction module to determine which part of an acquired image is to be read from system memory for correction. Thus, the zoom and pan module is responsive in certain embodiments, or is configurable to be responsive, either to automatic detection of candidate region(s) of interest and/or manual selection by a user of a region of interest.

The mixer module can, for example, superimpose user interface icons in the images of the stream to be displayed on display 32 and so assist with user interaction.

In any case, the in-focus and distortion-corrected ROIs are transmitted in certain embodiments as successive frames or frame portions of a video signal to the remote location (i.e., the other end of the video conferencing connection), as well as to the local monitor 32 for display as a video image in a reserved part 40 in the upper right of the monitor screen 42.

This is to allow the local participants to check what is being sent to the remote location. As mentioned, the rest of the screen 42 is typically occupied by the video image from the remote location.

In certain embodiments, it is possible to both pan and zoom the ROI 36, so that an enlarged ROI cannot be brought substantially into focus as a whole on the sensor array 22 for a single lens/array distance. In these embodiments, the camera software may be configured to sub-divide an enlarged ROI into two or more sub-regions and adjust the lens/array distance in respect of each sub-region to bring that sub-region substantially into focus on the sensor array in a number of separate images. The multiple sub-regions could then be extracted from multiple input images captured in quick succession with different ROIs in focus and stored, and then combined to form a substantially in-focus image of the enlarged region of interest. This synthesised ROI is then in certain embodiments distortion corrected to provide one enlarged ROI for one time frame of the video signal as previously described. Alternatively, distortion correction may be performed on the individual ROIs extracted from respective input images before they are combined to provide the enlarged ROI.

In some implementations, rather than employing a more conventional RGB or RGBW sensor array, an RGBIR (RGB infrared) sensor array can be employed. This allows separate processing to be performed on separate planes of the images being captured by the sensor array. So, for example, the face detection (or gesture detection) module of FIG. 6 could operate on a non-distortion corrected, sub-sampled version of the complete field of view to identify one or more ROI's corresponding to subjects who have been detected within the field of view; or possibly subjects moving within the field of view. As IR (infrared) images tend not to be completely sharp in any case, it can be sufficient for detection and tracking purposes to operate on the distorted version of the scene in attempting to detect and track potential candidate region(s) of interest.

The correction module then in turn processes only the RGB planes of the ROI to provide the corrected image for the region of interest for subsequent display.

The invention is not limited to the embodiments described herein which may be modified or varied without departing from the scope of the invention.

US published patent application US 2011-0216156 and U.S. application Ser. Nos. 13/077,891, 13/078,970 and 13/084,340, which are assigned to the same assignee and hereby incorporated by reference, disclose digital image acquisition devices including WFOV lens systems. In certain embodiments, distorted WFOV images are read from a sensor via an imaging pipeline which is configured to carry out pre-processing of an image before being read across a system bus into system memory.

Figures 3A, 3B:
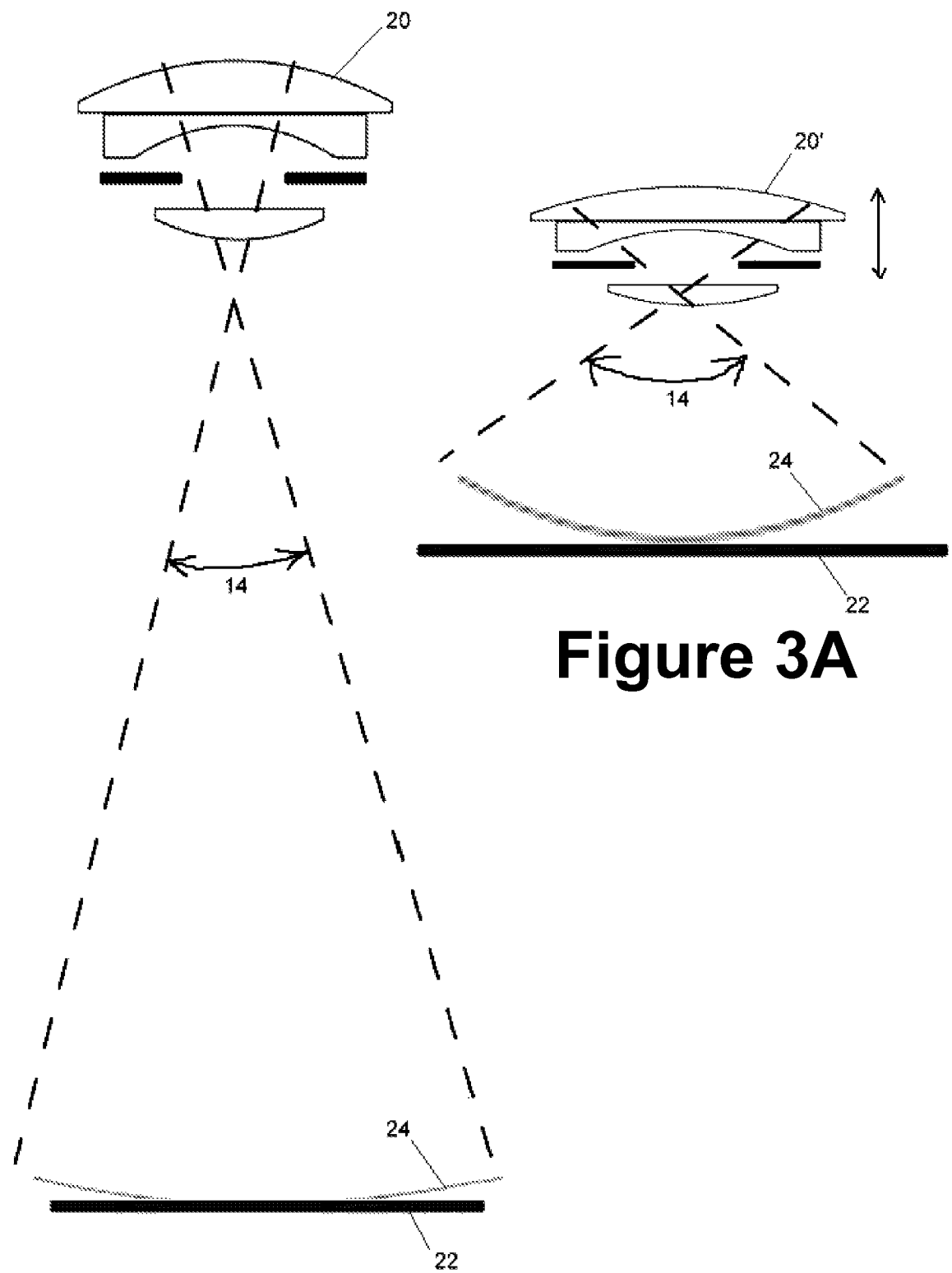
FIGS. 3A-3B and 4A-4F illustrate certain problems arising in the implementation of a mobile phone for video conferencing.
Figure 4A:
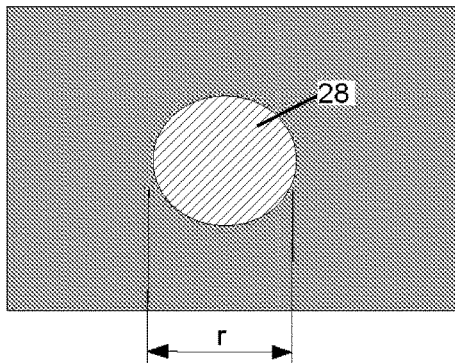
Figure 4B:
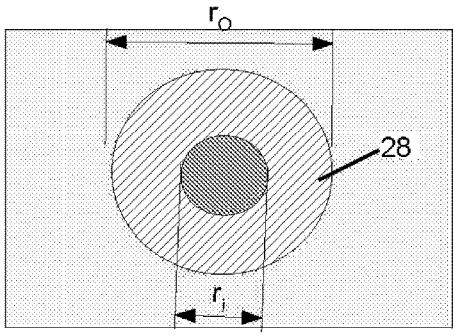
Figure 4C:
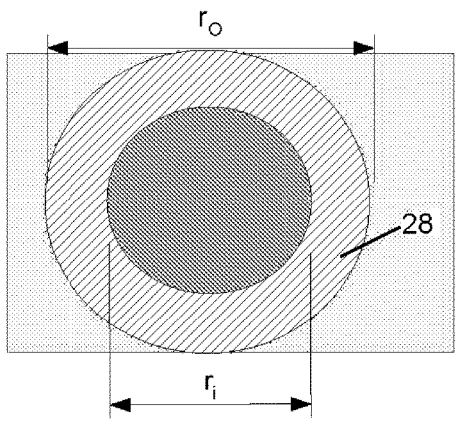
Figure 4D:
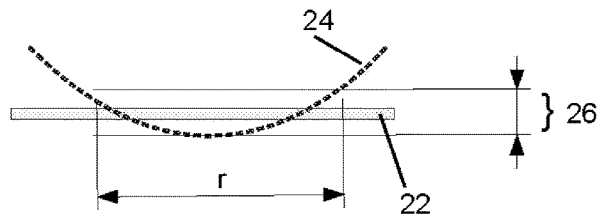
Figure 4E:
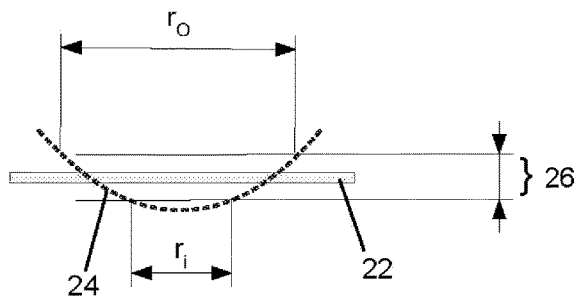
Figure 4F:
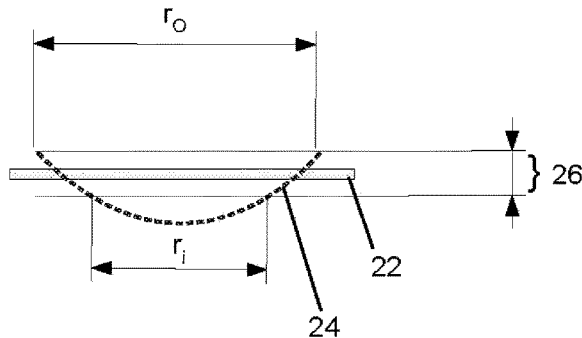

Such systems can employ hardware modules or sub-modules also connected directly or indirectly to the system bus for reading successive images stored in system memory from the bus and for processing the image before either returning the processed image to system memory or forwarding the processed image for further processing. The WFOV correction module illustrated by example in FIGS. 3A-3B is configured to successively read distorted images or image portions and provide corrected images or image portions to a face detection (FD) and/or tracking module.

An efficient mechanism is provided in certain embodiments for performing complex distortion compensation on an input image in a processor and memory in an efficient manner with relatively low or even minimal demands on the system bus.

Advantageous correction modules are provided herein to address distortion problems in images captured by various types of digital image acquisition devices including digital still cameras, video cameras, camera-phones, camera modules, web cameras, and other camera-enabled devices. All references cited herein are incorporated by reference, including the following as describing camera devices and features in accordance with alternative embodiments:

U.S. Pat. Nos. 7,224,056, 7,683,468, 7,936,062, 7,935,568, 7,927,070, 7,858,445, 7,807,508, 7,569,424, 7,449,779, 7,443,597, 7,768,574, 7,593,636, 7,566,853, 8,005,268, 8,014,662, 8,090,252, 8,004,780, 8,119,516, 7,920,163, 7,747,155, 7,368,695, 7,095,054, 6,888,168, 6,583,444, and 5,882,221, and US published patent applications nos. 2012/0063761, 2011/0317013, 2011/0255182, 2011/0274423, 2010/0053407, 2009/0212381, 2009/0023249, 2008/0296717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, 2005/0067688, and U.S. patent application No. 61/609,293, and PCT applications nos. PCT/US2012/024018 and PCT/IB2012/000381.

Components of MEMS actuators in accordance with alternative embodiments are described at U.S. Pat. Nos. 7,972,070, 8,014,662, 8,090,252, 8,004,780, 7,747,155, 7,990,628, 7,660,056, 7,869,701, 7,844,172, 7,832,948, 7,729,601, 7,787,198, 7,515,362, 7,697,831, 7,663,817, 7,769,284, 7,545,591, 7,792,421, 7,693,408, 7,697,834, 7,359,131, 7,785,023, 7,702,226, 7,769,281, 7,697,829, 7,560,679, 7,565,070, 7,570,882, 7,838,322, 7,359,130, 7,345,827, 7,813,634, 7,555,210, 7,646,969, 7,403,344, 7,495,852, 7,729,603, 7,477,400, 7,583,006, 7,477,842, 7,663,289, 7,266,272, 7,113,688, 7,640,803, 6,934,087, 6,850,675, 6,661,962, 6,738,177 and 6,516,109; and at US published patent applications nos. 2010/030843, 2007/0052132, 2011/0317013, 2011/0255182, 2011/0274423, and at U.S. unpublished patent application Ser. Nos. 13/302,310, 13/247,938, 13/247,925, 13/247,919, 13/247,906, 13/247,902, 13/247,898, 13/247,895, 13/247,888, 13/247,869, 13/247,847, 13/079,681, 13/008,254, 12/946,680, 12/946,670, 12/946,657, 12/946,646, 12/946,624, 12/946,614, 12/946,557, 12/946,543, 12/946,526, 12/946,515, 12/946,495, 12/946,466, 12/946,430, 12/946,396, 12/873,962, 12/848,804, 12/646,722, 12/273,851, 12/273,785, 11/735,803, 11/734,700, 11/848,996, 11/491,742, and at USPTO-Patent Cooperation Treaty applications (PCTS) nos. PCT/US12/24018, PCT/US11/59446, PCT/US11/59437, PCT/US11/59435, PCT/US11/59427, PCT/US11/59420, PCT/US11/59415, PCT/US11/59414, PCT/US11/59403, PCT/US11/59387, PCT/US11/59385, PCT/US10/36749, PCT/US07/84343, and PCT/US07/84301, which are all incorporated by reference.

All references cited above and below herein are incorporated by reference, as well as the background, abstract and brief description of the drawings, and U.S. patent application Ser. Nos. 12/213,472, 12/225,591, 12/289,339, 12/774,486, 13/026,936, 13/026,937, 13/036,938, 13/027,175, 13/027,203, 13/027,219, 13/051,233, 13/163,648, 13/264,251, and PCT application WO2007/110097, and U.S. Pat. Nos. 6,873,358, and RE42,898.

The following are also incorporated by reference as disclosing alternative embodiments:

U.S. Pat. Nos. 8,055,029, 7,855,737, 7,995,804, 7,970,182, 7,916,897, 8,081,254, 7,620,218, 7,995,855, 7,551,800, 7,515,740, 7,460,695, 7,965,875, 7,403,643, 7,916,971, 7,773,118, 8,055,067, 7,844,076, 7,315,631, 7,792,335, 7,680,342, 7,692,696, 7,599,577, 7,606,417, 7,747,596, 7,506,057, 7,685,341, 7,694,048, 7,715,597, 7,565,030, 7,636,486, 7,639,888, 7,536,036, 7,738,015, 7,590,305, 7,352,394, 7,564,994, 7,315,658, 7,630,006, 7,440,593, and 7,317,815, and U.S. patent application Ser. Nos. 13/306,568, 13/282,458, 13/234,149, 13/234,146, 13/234,139, 13/220,612, 13/084,340, 13/078,971, 13/077,936, 13/077,891, 13/035,907, 13/028,203, 13/020,805, 12/959,320, 12/944,701 and 12/944,662, and United States published patent applications serial nos. 2012/0019614, 2012/0019613, 2012/0008002, 2011/0216156, 2011/0205381, 2012/0007942, 2011/0141227, 2011/0002506, 2011/0102553, 2010/0329582, 2011/0007174, 2010/0321537, 2011/0141226, 2010/0141787, 2011/0081052, 2010/0066822, 2010/0026831, 2009/0303343, 2009/0238419, 2010/0272363, 2009/0189998, 2009/0189997, 2009/0190803, 2009/0179999, 2009/0167893, 2009/0179998, 2008/0309769, 2008/0266419, 2008/0220750, 2008/0219517, 2009/0196466, 2009/0123063, 2008/0112599, 2009/0080713, 2009/0080797, 2009/0080796, 2008/0219581, 2009/0115915, 2008/0309770, 2007/0296833 and 2007/0269108.

Auto-focus features may be included in a camera or camera module as described at US published patent application no. 2012/0075492 and/or U.S. application Ser. Nos. 12/944,701, 12/944,703, 13/020,805, 13/077,891 and 13/077,936.

Features described at U.S. application Ser. Nos. 13/028,203, 13/028,205 and 13/028,206 are incorporated by reference and may also be used in alternative embodiments to register images captured that have global or local rotation between them and/or to discern the motion of the camera module and/or one or more objects in a captured scene.

It will be appreciated that the illustrated embodiment is provided for exemplary purposes only and that many variations of the implementation are possible. For example, some functionality shown as being implemented in one module could be migrated to other modules.

In the illustrated embodiment, tiles have been described as rectangular and defined by four nodes. In another embodiment, non-rectangular tiles are defined by 3 or more nodes; and indeed the local grid need not be defined by a uniform array of tiles. Instead, these could in certain applications be non-uniform.

The invention is not limited to the embodiment(s) described herein but can be amended or modified without departing from the scope of the present invention, as set forth in the appended claims and structural and functional equivalents thereof.

What is claimed is:

1. A method of generating a digital video image using a lens positioned in front of an image sensor array, including providing a lens having a sufficiently wide field of view (WFOV), and positioned sufficiently near to the sensor array, that the image field of the lens is so curved at the sensor array that different regions of the image field are substantially in focus on the sensor array for different positions of the lens relative to the sensor array, the method further comprising:
   (a) selecting a desired region of interest in the image field of the lens,
   (b) adjusting the position of the lens relative to the sensor array so that the selected region of interest is brought substantially into focus on the sensor array,
   (c) capturing and storing the image on the sensor array of the substantially in-focus selected region of interest,
   (d) at least partially correcting the stored substantially in-focus image for field-of-view distortion due to said WFOV lens,
   (e) displaying the corrected image, and
   (f) cyclically repeating steps (a) to (e).

2. The method claimed in claim 1, wherein adjusting the position of the lens relative to the sensor array comprises adjusting the axial distance of the lens from the sensor array.

3. The method claimed in claim 1, wherein the selected region of interest is one of a plurality of sub-regions of a larger region of interest which cannot be brought substantially into focus as a whole on the sensor array, and wherein step (b) comprises adjusting the position of the lens in respect of each said sub-region to bring that sub-region substantially into focus on the sensor array, and step (c) comprises capturing and storing each said sub-region, and combining the stored sub-region images to form a substantially in-focus image of the larger region of interest.

4. The method claimed in claim 1, wherein the lens comprises a MEMS-actuated lens.

5. The method claimed in claim 1 wherein step (a) comprises selecting a plurality of regions of interest and repeating steps (b) to (e) for each region of interest.

6. The method of claim 1 wherein step (a) comprises automatically detecting a desired region of interest within the complete image field.

7. The method of claim 6 wherein said image comprises a plurality of image planes including an infra-red (IR) image plane and wherein said automatically detecting is performed on said IR plane of said image.

8. The method of claim 7 wherein said steps (c) to (e) are performed on visible colour planes of said image.

9. The method of claim 7 wherein said automatically detecting is based on face detection or gesture detection or both.

10. The method of claim 1 wherein said selecting is based on video or audio analysis or both.

11. A digital image acquisition device for generating a digital video image comprising: a lens positioned in front of an image sensor array, the lens having a sufficiently wide field of view (WFOV), and being positioned sufficiently near to the sensor array, that the image field of the lens is so curved at the sensor array that different regions of the image field are substantially in focus on the sensor array for different positions of the lens relative to the sensor array, the device including a processor arranged to iteratively:
   (a) select a desired region of interest in the image field of the lens,
   (b) adjust the position of the lens relative to the sensor array so that the selected region of interest is brought substantially into focus on the sensor array,
   (c) capture and store the image on the sensor array of the substantially in-focus selected region of interest,
   (d) at least partially correct the stored substantially in-focus image for field-of-view distortion due to said WFOV lens, and
   (e) display, transmit or store the corrected image.

12. The device claimed in claim 11, wherein adjusting the position of the lens relative to the sensor array comprises adjusting the axial distance of the lens from the sensor array.

13. The device claimed in claim 11, wherein the selected region of interest comprises one of a plurality of sub-regions of a larger region of interest which cannot be brought substantially into focus as a whole on the sensor array, and wherein step (b) comprises adjusting the position of the lens in respect of each said sub-region to bring that sub-region substantially into focus on the sensor array, and step (c) comprises capturing and storing each said sub-region, and combining the stored sub-region images to form a substantially in-focus image of the larger region of interest.

14. The device claimed in claim 11, wherein the lens comprises a MEMS-actuated lens.

15. The device claimed in claim 11 wherein step (a) comprises selecting a plurality of regions of interest and repeating steps (b) to (e) for each region of interest.

16. The device of claim 11 wherein step (a) comprises automatically detecting a desired region of interest within the complete image field.

17. The device of claim 16 wherein said image comprises a plurality of image planes including an infra-red (IR) image plane and wherein said automatically detecting is performed on said IR plane of said image.

18. The device of claim 17 wherein said steps (c) to (e) are performed on visible colour planes of said image.

19. The device of claim 17 wherein said automatically detecting is based on face detection or gesture detection or both.

20. The device of claim 11 wherein said selecting is based on video or audio analysis or both.

* * * * *